United States Patent [19]
Fletcher et al.

[11] 3,883,872
[45] May 13, 1975

[54] SYSTEM FOR INTERFERENCE SIGNAL NULLING BY POLARIZATION ADJUSTMENT

[76] Inventors: James C. Fletcher, Administrator of the National Aeronautics and Space Administration with respect to an invention of; John E. Ohlson, Marina; William F. Williams, Torrance, both of Calif.

[22] Filed: June 28, 1973

[21] Appl. No.: 374,422

[52] U.S. Cl. .......................... 343/100 PE; 343/5 GC
[51] Int. Cl. ............................................... H04b 7/00
[58] Field of Search......... 343/100 PE, 16 M, 5 GC, 343/7 A

[56] References Cited
UNITED STATES PATENTS

| | | | |
|---|---|---|---|
| 2,530,418 | 11/1950 | Alvarez | 343/5 GC |
| 2,550,700 | 5/1951 | Lancor, Jr. et al. | 343/5 GC |
| 3,044,062 | 7/1962 | Katzin | 343/100 R |
| 3,093,824 | 6/1963 | Ammerman | 343/100 PE |
| 3,310,805 | 3/1967 | Viglietta et al. | 343/100 PE |
| 3,353,180 | 11/1967 | Anderson | 343/16 M |
| 3,540,045 | 11/1970 | Taylor | 343/100 PE |
| 3,716,856 | 2/1973 | Beguin | 343/100 PE |

*Primary Examiner*—Maynard R. Wilbur
*Assistant Examiner*—T. M. Blum
*Attorney, Agent, or Firm*—Monte F. Mott; Paul F. McCaul; John R. Manning

[57] ABSTRACT

A receiving system for automatically selecting a desired one of two approximately orthogonally polarized signals occupying the same bandwidth, is disclosed. Received signals are provided by any orthomode antenna system at a pair of output ports, i.e., right hand and left hand circular polarizations or two linear polarizations. The received signals are then applied to the inputs of a hybrid junction to produce sum and difference signals. The resulting sum signal at one output port comprises components of the undesired one of two orthogonally polarized signals and is used to coherently detect and dynamically balance out the undesired signal components that are included at the difference signal port. The desired one of two orthogonally polarized signals is thereby provided at the difference port of the hybrid junction. Feedback loops are used to effect dynamic balancing.

14 Claims, 2 Drawing Figures

SYSTEM FOR INTERFERENCE SIGNAL NULLING BY POLARIZATION ADJUSTMENT

BACKGROUND OF THE INVENTION

1. Origin of the Invention

The invention described herein was made in the performance of work under a NASA contract and is subject to the provisions of Section 305 of the National Aeronautics and Space Act of 1958, Public Law 85-568 (72 Sta. 435; U.S.C. 2457).

2. Field of the Invention

This invention generally relates to a technique and apparatus for enabling multi-channel communications wherein the same, or nearly the same, bandwidth is used for two channels of information signals. More specifically, the present invention concerns a system for automatically dynamically nulling, or balancing out, components of the undesired one of two signals at a receiver to permit the desired signals to be received without interference from the undesired signals.

3. Description of the Prior Art

Future advanced telemetry and communication systems will require techniques for spectrum conservation. Typically, multi-beam antennas will be used to transmit several separate channels of information. Obviously, the use of a single channel for transmission of two information channels would work greatly towards the desired goal of spectrum conservation.

As is well known, modern multiple channel transmission techniques require a high degree of isolation between channels. If such transmission occurs from spacecraft antennas that are in close proximity, or from a single multi-beam antenna, some of the required isolation might be provided by the directive nature of the transmit antenna beams which would have very low sidelobes. Normally, the use of such spacecraft antennas negates any isolation that might have been provided by the beam directivity of the receiving antenna. In the event that systems requirements do not permit or provide sufficient antenna beam directivity and isolation, orthogonal polarizations for the two channels may be used to enhance isolation.

Such modern transmission techniques using a single antenna, or antenna pairs, are not perfect. The best transmitting systems may typically have 1.0 dB axial ratios on their circular polarization or similar shortcomings with linear polarization. Whatever the transmitting antenna imperfection, it must be matched at the receiving antenna to obtain a high degree of isolation. Even then these imperfections will vary from channel to channel so that a receiver should be able to track the imperfections.

The subject invention is also highly applicable to more everyday uses. For example, the subject technique can be used for the transmission of television signals wherein two distinct and separate television signals are transmitted in the same channel with orthogonal polarizations. Such an implementation would permit a receiver to be switched to select reception of one of two programs both appearing on the same television channel. If this objective were to be attempted by simply selecting one of two polarizations by using a polarizer, the imperfections of said polarizer would cause the desired picture to be interfered with by the companion undesired picture which would fade in and out intermittently or persistently.

Clearly, if the undesired one of two orthogonally polarized signals were to be eliminated at a receiver, the interference caused thereby would also be substantially eliminated. Numerous polarization tracking techniques are known in the prior art for tracking or detecting the polarization of single signals. The techniques disclosed by U.S. Pat. Nos. 3,310,805, 3,359,555 and 3,540,045 are exemplary of such prior art techniques. Also, techniques are known for automatically tracking and nulling out unwanted polarizations where there is some distinct difference in signals that can be recognized or detected such as a pilot signal, a large duty cycle difference, or a bandwidth difference as exemplified by U.S. Pat. Nos. 3,049,703, 3,500,207, and 3,044,062. Further, manual techniques for nulling an undesired signal having a predetermined polarization are known. Such manual techniques are exemplified by the disclosure of U.S. Pat. No. 3,093,824 which indicates that manual adjustments to the phase and magnitude of a received signal may be made to produce the nulling of certain undesired signal components. However, such manual techniques have been heretofore essentially confined to laboratory procedures due to being cumbersome and of no practical value insofar as continuous operation of a communication system is concerned. Also, this last mentioned patented system provide an indication, known as an "error signal," of the misadjustment to be corrected. The present invention provides such an indication and automatically makes such correction.

OBJECTS AND SUMMARY OF THE INVENTION

Accordingly, it is an object of the present invention to provide a receiver system that is capable of automatically nulling out undesired received signals having approximately orthogonal polarizations and occupying the same bandwidth.

It is another object of the present invention to provide a receiving system that operates to coherently detect such undesired received signals and carry out automatic phase and amplitude adjustments to effectively null such undesired signals.

It is a further object of the present invention to provide a technique by which two channels of information may be transmitted in the same bandwidth by being approximately orthogonally polarized without the requirement for extensive procedures and equipment to provide channel or beam isolation.

Briefly described, the present invention involves a technique and apparatus for receiving without interference, a selected one of two orthogonally polarized signals transmitted in the same bandwidth.

More particularly, the subject invention involves the use of an orthomode antenna for providing components of desired and undesired, orthogonally polarized, received signals at the output ports thereof as a pair of orthogonal channels. The received signals in the two orthogonal channels are applied as inputs to a hybrid junction which operates to produce sum and difference signals at the two outputs thereof. The sum signal will comprise primarily components of the undesired received signals and is used to coherently detect, and dynamically null, components of the undesired signal that would otherwise be present in the difference signal. The components of the undesired received signal are thus nulled from the difference signal leaving only components of the desired signal, which is then available for use.

Further objects and the many attendant advantages of the invention will be more readily appreciated as the same becomes better understood by reference to the following detailed description which is to be considered in connection with the accompanying drawings wherein like reference symbols designate like parts throughout the figures thereof.

DETAILED DESCRIPTION OF THE PREFERRED EMBODIMENT

Figure 1:
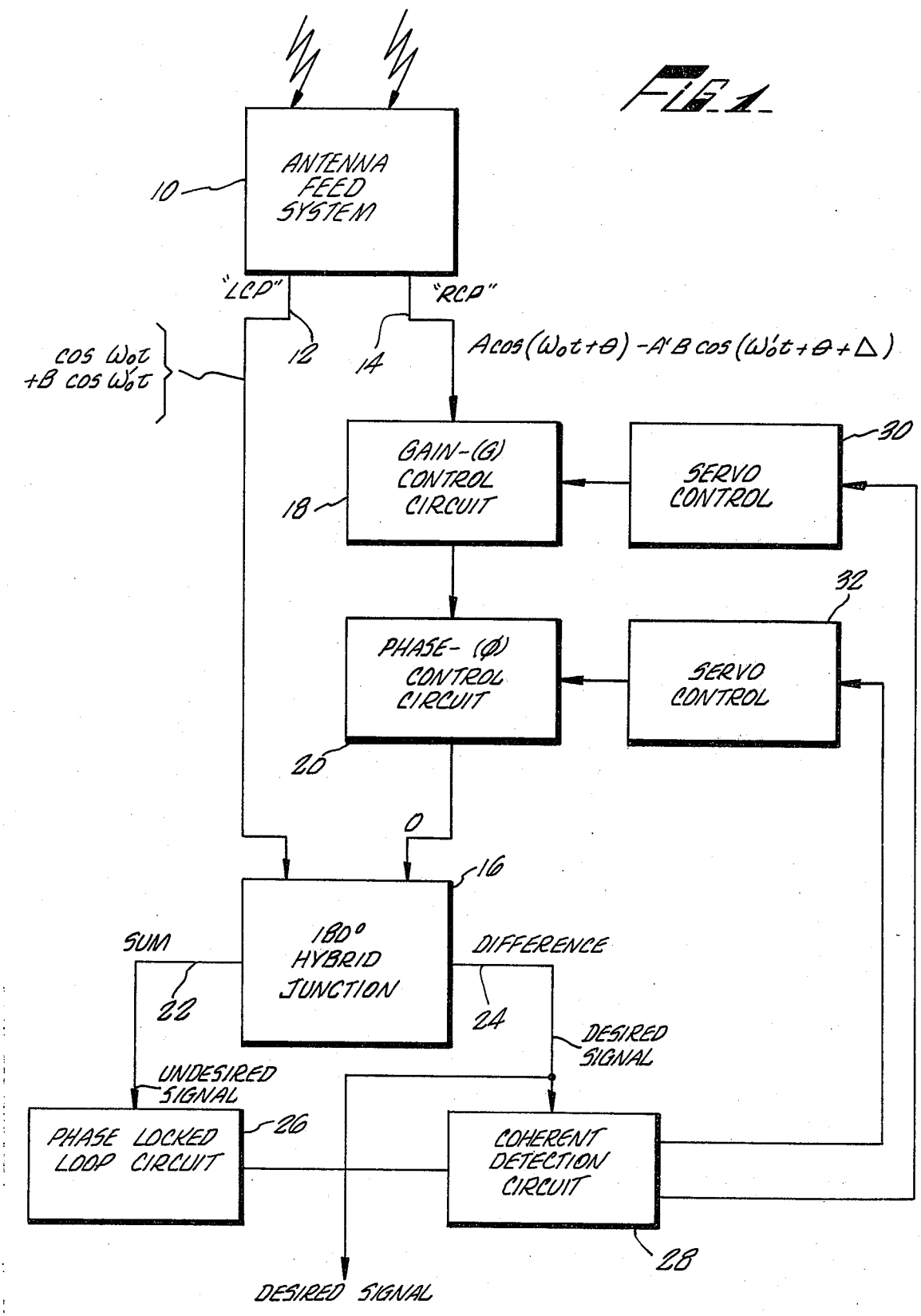
FIG. 1 is a general schematic block diagram illustrating an embodiment of the subject invention.

Referring to FIG. 1 of the drawings, a receiver system in accordance with the present invention includes an orthomode antenna 10 having a pair of output ports or terminals 12 and 14. It is to be understood that such antenna 10 is situated to receive a pair of information signals having the same bandwidth occupancy and which are approximately orthogonally polarized, i.e., right and left circular polarizations, or vertical and horizontal linear polarizations. It is important to note that the signals need not be perfectly orthogonally polarized nor does the antenna need to be perfectly orthogonally polarized. The invention has the distinct capability of nulling out the undesired signal regardless of signal or antenna imperfections.

We shall assume in the discussion to follow that the received signals are approximately orthogonally linearly polarized. The antenna feed system 10 is then taken to be responsive to right and left hand circular polarizations. This is not intended to limit the range of applicability of the invention but only to simplify the discussion. The technique described with reference to FIG. 1 is applicable as well to received signals having approximately orthogonal circular polarizations, using an antenna feed system 10 which is responsive to approximately orthogonal linear polarizations. As can be deduced by one versed in the art, there is no restriction to either circular or linear polarizations for this technique. Further, any pair of approximately orthogonally elliptically polarized waves may be treated by an appropriate antenna feed system 10.

The respective signals appearing at the output ports 12 and 14 of the antenna 10, are the left hand circularly polarized (LCP) and right hand circularly polarized (RCP) components of the signals received by the antenna 10. As is well known to one versed in the art, a single received linearly polarized signal (undesired) will give approximately equal outputs at the ports 12 and 14. If we assume, without loss of generality, that these two outputs are in time phase, then it is easily demonstrated that a second received linearly polarized signal (desired) which is approximately spatially orthogonal to the first, will also give approximately equal outputs at the ports 12 and 14, but they will be approximately 180° out of time phase. The essence of the invention is to automatically find and apply gain (amplitude) and phase corrections to the signals provided at the output port 14 such that by utilizing a hybrid junction 16 (which forms the sum and difference of its inputs) the components of the undesired signal will be nulled out at the "difference" output of the hybrid 16 while the components of the desired signal will be reinforced at the difference output and be available for use, untainted by the undesired signal. As shown, the signals from the output port 12 are applied directly as an input to the hybrid junction 16 while the signals outputted at the port 14 are applied to the hybrid junction 16 via a variable gain control circuit 18 and a variable phase control circuit 20.

The hybrid junction 16 operates to provide conventional sum and difference signals at a pair of output terminals 22 and 24, respectively. The sum signals provided at the output terminal 22 will characteristically consist primarily of components of the undesired signal as is explained in greater detail hereinafter, and may thus be employed to coherently detect and vary the polarization characteristics, i.e., gain and phase, of the components of the undesired signal outputted at port 14 of the antenna 10 so as to have the difference signal at the output 24 of the hybrid junction 16 be entirely the desired signal.

Coherent detection may in this case simply involve the use of a phase locked loop circuit 26 which provides an output signal that is phase locked with the sum signals from the hybrid junction 16. Such phase locked loop circuit 26 may be of any conventional design. Any appropriate coherent detection circuit 28 may then be employed to continually detect the presence of components of the undesired signal that may appear in the difference signal from the hybrid junction 16, which presence would result in the detection circuit 28 providing error signals that are used to effect appropriate phase ($\phi$) and gain (G) control via a feedback loop including servo control circuits 30 and 32, as shown. It is to be understood that the general block diagram of FIG. 1 is of primarily a functional nature to explain the subject invention. A preferred embodiment is described in conjunction with FIG. 2.

The phase locked loop circuit locks onto and tracks the carrier of the undesired signal. The invention causes nulling of the carrier at the difference output 24 and since the data sidebands of a signal have the same polarization as the carrier, the entire undesired signal is nulled at the output 24. The carriers of the desired and undesired signal need to be slightly different so that unambiguous tracking of the undesired signal is performed by the phase locked loop circuit 26. This is a trivial requirement in practice and will virtually always occur due to practical frequency instabilities. Note, however, that such frequency difference will be much, much smaller than the modulation bandwidth so that the signals will still occupy the same bandwidth.

The servo control circuits 30 and 32 may be of any conventional design including any of the well-known servo amplifiers and servomotors which may be operated to vary the elements being controlled. The controlled elements are, in this case, a variable gain control circuit 18 and a variable phase control circuit 20. As an alternative to using the conventional electromechanical servomotor and servo amplifier combination, an electronic servo control may be employed. For example, the servo control circuit 30 connected to the variable gain control circuit 18 may be an integrating circuit of any well known type. It is to be, of course, understood that both of the servo controlled loops, of which the servo control circuits 30 and 32 are a part, will operate to effectively vary the variable gain control circuit 18 and the variable phase control circuit 20 to have the error signals reduced to zero as is explained in greater detail hereinafter.

It is clear that wherein the variable gain control circuit 18 and the variable phase control circuit 20 are controlled to nullify or balance out the components of the undesired signals, the remaining signal components at the output 24 of the hybrid junction 16 will be components of the desired one of two signals received by the antenna 10.

To further describe the invention of FIG. 1 in detail, let the signal at the antenna output port 12 be represented by $\cos \omega_o t + B \cos \omega_o' t$ where $\omega_o$ is the carrier frequency of the undesired signal, $\omega_o'$ is the carrier frequency of the desired signal, and $B$ is the relative amplitude of the desired signal. Relative to the signal at the output port 12, the signal at the output port 14 may be generally represented by $$A \cos(\omega_o t + \theta) - A'B \cos(\omega_o' t + \theta + \Delta)$$

where $A$ and $A'$ are near one, $\theta$ is the relative phase shift between channels and $\Delta$ is near zero, so as to represent the conditions at the output of an orthomode antenna which excited by a pair of approximately orthogonal, linearly polarized signals, as discussed above. It is clear that if the signal at the output port 14 undergoes an amplitude change of $1/A$ in the gain control circuit 18 and a phase delay of $\theta$ in the phase control circuit 20, that there will be no signal of frequency $\omega_o$ at the difference output 24 of the hybrid junction 16. However, with $A'$ near one and $\Delta$ near zero, the signal at the output 24 will be the desired signal having frequency components of $\omega_o'$, plus of course the data sidebands thereof as desired.

Clearly, the components of the interfering undesired signal are reduced to zero, or balanced out, at the difference output terminal 24 of the hybrid junction 16 by controlling the variable gain control circuit 18 to provide a gain of $1/A$ and by controlling the variable phase control circuit 20 to provide a phase angle lag $\phi = \theta$.

Figure 2:
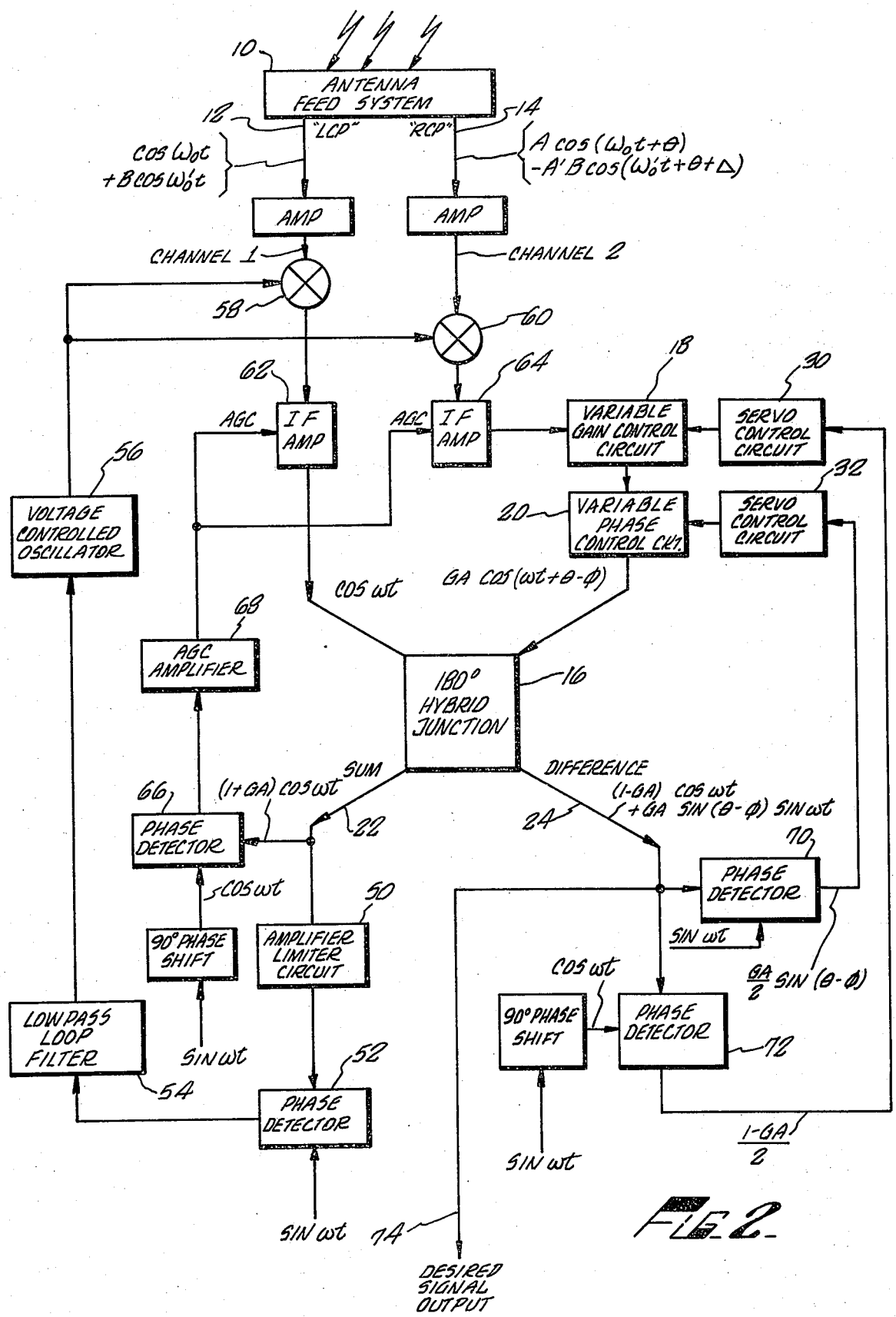
FIG. 2 is a detailed schematic block diagram illustrating a preferred embodiment of the subject invention.

Referring now to FIG. 2, coherent detection of the undesired signal may be accomplished by using the sum signal from the hybrid junction 16 to control the phase and the gain of both the respective signals outputted at the terminal 14 of the antenna 10. As shown, the sum signal appearing at the output terminal 22 of the hybrid junction 16 may be applied to an amplitude limiter circuit 50 to be phase detected by a phase detector circuit 52 with a reference signal which may be readily expressed as $\sin \omega t$. The output of the phase detector circuit 52 may be applied through a lowpass loop filter 54 as an input to a voltage controlled oscillator 56. The output of the oscillator 56 is then applied to a pair of mixer circuits 58 and 60 which are respectively connected to receive signals provided at the output ports 12 and 14 of the antenna 10 via, if desired, a pair of amplifiers 62 and 64. The signals from the antenna 10 are thereby heterodyned to produce a desired intermediate frequency, $\omega$, for the receiver operation. More importantly, the outputs of the mixer circuits 58 and 60 are accordingly phaselocked to the reference signal $\sin \omega t$.

The sum signal appearing at the output 22 of the hybrid junction 16 is also employed to provide automatic gain control for the respective signals provided at the outputs of the mixer circuits 62 and 64 so as to have both antenna channels of equal gain. As illustrated, a conventional automatic gain control (AGC) loop may be used wherein a pair of IF amplifiers 62 and 64 are respectively connected to receive signals outputted from the mixer circuits 58 and 60. The IF amplifiers 62 and 64 may be simply controlled by having applied thereto the sum signal after being coherently detected in a phase detector circuit 66 with a 90° phase shifted version of the reference signal, i.e., $\cos \omega t$. The output of the phase detector circuit 66 may be amplified by an amplifier 68, the output of which is connected to the IF amplifiers 62 and 64.

The difference signals are fed back to continually nullify any components of the undesired signal that may be present in the difference signal provided by hybrid junction 16. This is accomplished with the earlier mentioned adjustments to the phase and gain of the signals outputted from the output 14 of the antenna 10. In the lower half of FIG. 2, expressions for only components due to the undesired signal, are shown for simplicity.

It is a simple matter for persons having ordinary skill in the art to mathematically establish that the expressions given for the signal occurring at output 24 of the hybrid junction in FIG. 2 are formulated when trigonometric manipulations are made and $\phi$ is assumed to be near $\theta$ in value.

The difference signals from the hybrid junction 16 are phase detected with the reference signal, $\sin \omega t$, in a phase detector circuit 70, the output of which is applied to the servo control 32 for operation of the phase shifter 20. As earlier explained, the servo control 32 may include the conventional servo amplifiers and servomotor which controls the phase shifter 20 in accordance with error signals that are provided from the phase detector circuit 70 so as to reduce such error signals to zero. Specifically, if the components of the undesired signal appearing at the output 24 of the hybrid junction 16 is expressed as:

$$(1 - GA)\cos \omega t + GA \sin(\theta - \phi)\sin \omega t,$$

then phase detection with the reference signal, $\sin \omega t$ will produce the product expressed as:

$[(1 - GA)/2] \sin 2\omega t - (GA/2)\sin(\theta - \phi)\cos 2\omega t + (GA/2)\sin(\theta - \phi).$ The first two terms are AC components which will be ignored by the servo control 32; however, the third term $(GA/2)\sin(\theta - \phi)$, is a DC term which represents an error signal that will cause the servo control circuit 32 to operate the phase control circuit 20 to have the phase $\phi$ of the phase control circuit 20 cancel the phase angle $\theta$ by being equal and opposite thereto.

As shown, the difference signal is also applied to the phase detector circuit 72 along with a 90° phase shifted version of the reference signal, i.e., $\cos \omega t$. The output of the phase detector circuit 72 also provides an error signal which when applied to the servo control 30 will serve to have the variable gain control circuit 18 produce a gain necessary to cause the factor $(1 - GA)\cos \omega t$ at the output 24 to be zero. Specifically, where the difference signal appearing at the output 24 of the hybrid junction 16 is phase detected with the 90° phase shifted reference signal, $\cos \omega t$, the result will be a product expressed as:

$[(1 - GA) \cos \omega t + GA \sin(\theta - \phi) \sin \omega t] \cos \omega t$
$= (1 - GA)/2 + (1 - GA)/2 \cos 2\omega t + (GA/2) \sin(\theta - \phi) \sin 2\omega t.$ The last two terms of the product are AC terms which are ignored by the servo loop. The term $(1 - GA)/2$, is, however, a DC term which when applied to the servo control circuit 30 as an error signal will operate to have the variable gain control circuit 18 effect a gain $G = 1/A$ to effectively nullify itself or have the error signal reduced to zero. It is clear that the phase and gain adjustments made by the circuits 18 and 20 will continually serve to balance out the undesired signal components as is required.

To summarize, the difference signal from the hybrid junction 16 is continually applied to the servo control circuits 30 and 32 to have the gain and phase of the signal provided at the output of the amplifier 64 continually dynamically controlled such that the components of the undesired signal are nulled in the difference signal. It thus becomes clear that the remaining signal components at the output 24 of the hybrid junction 16 are components of the desired signal and may thus be provided at an output terminal 74 to an appropriate utilization device.

As may be recalled, it was assumed for the purpose of the preceding discussion that $\omega_o$ was the carrier frequency of the undesired signal and that $\omega_o'$ was the carrier frequency of the desired signal. Accordingly, as earlier explained, the phase locked loop formed by the phase detector circuit 52, the lowpass loop filter 54, the voltage controlled oscillator 56, and the mixers 58 and 60 operated to coherently detect the undesired signal. Obviously, this procedure simply involved heterodyning the undesired carrier frequency, $\omega_o$, to a selected IF reference frequency, $\omega$, by applying the oscillator frequency, $\omega_{vco}$, to the mixers 58 and 60, i.e., $\omega_o - \omega_{vco} = \omega$. Thus, should $\omega_o'$ represent the carrier frequency of the undesired signal rather than the desired signal, the phase locked loop must operate to coherently detect the carrier frequency $\omega_o'$. This would simply require the $\omega_{vco}$ be altered to satisfy the expression $\omega_o' - \omega_{vco} = \omega'$. Any well known means, i.e., manual adjustment may be used to make the necessary changes to $\omega_{vco}$. The desired signals having the carrier frequency, $\omega_o$, would then be provided at the output 24 of the hybrid junction 16.

It is to be understood that each of the elements and components described for use with the subject invention are conventional well known devices and a detailed explanation of such elements is deemed unnecessary and has been omitted herefrom.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A receiving system for selecting a desired one of two orthogonally polarized signals occupying the same bandwidth, said receiving system including:
   an orthomode antenna having two output ports at which components of said two orthogonally polarized signals are provided;
   a hybrid junction having a pair of input terminals for respectively receiving signals from the two output ports of said orthomode antenna, and sum and difference output terminals at which are respectively provided a sum signal representing the sum of the signals applied to said hybrid junction and a difference signal representing the difference of the signals applied to said hybrid junction;
   detection means for coherently detecting the presence of components of the undesired one of said two orthogonally polarized signals that may appear in said difference signal, said detection means providing error signals; and
   adjustment means responsive to said error signals for automatically nulling said components of said undesired signal to have said difference signal continually represent the desired one of said orthogonally polarized signals.

2. The system defined by claim 1, wherein said adjustment means includes a variable phase control circuit and a variable gain control circuit, which are connected to respectively adjust the phase and gain of components of said undesired signals that are applied from one output port to said orthomode antenna to said hybrid junction.

3. The system defined by claim 2, said adjustment means further including first and second servo control circuits each connected to receive error signals from said detection means for respectively operating said variable phase and gain control circuits in accordance with error signals from said detection means.

4. The system defined by claim 2 wherein said variable phase and gain control circuits are connected in series.

5. The system defined by claim 1, said detection meams being connected to the difference output terminal of said hybrid junction, components of said undesired signal including a phase component and an amplitude component, said detecting means including:
   first means for providing a first error signal representative of the phase component of said components of said undesired signal; and
   means for providing a second error signal representative of the amplitude components of said components of said undesired signal, wherein said first and second error signals are applied to said adjustment means.

6. The system defined by claim 5, said first means including means for coherently detecting said phase component of said components of said undesired signal and said second means including means for coherently detecting said amplitude component of said components of said undesired signal.

7. The system defined by claim 1 further including:
   frequency control means for heterodyning the output signals provided at the two output ports of said orthomode antenna to a predetermined intermediate frequency; and
   means connected to receive said sum signals from said hybrid junction for providing phase lock error signals to said frequency control means for maintaining said predetermined frequency.

8. The system defined by claim 7, said frequency control means including:
   a voltage controlled oscillator connected to receive said phase lock error signals; and
   a pair of mixer circuits each connected to a different one of said two output ports of said orthomode antenna and to said voltage controlled oscillator.

9. The system defined by claim 2, said detection means being connected to the difference output terminal of said hybrid junction, components of said undesired signal including a phase component and an amplitude component, said detecting means including:
first means for providing a first error signal representative of the phase component of said components of said undesired signal; and
means for providing a second error signal representative of the amplitude component of said components of said undesired signal, wherein said first and second error signals are applied to said adjustment means.

10. The system defined by claim 9 further including:
frequency control means for heterodyning the output signals provided at the two output ports of said orthomode antenna to a predetermined intermediate frequency; and
means connected to receive said sum signals from said hybrid junction for providing phase lock error signals to said frequency control means for maintaining said predetermined frequency.

11. The system defined by claim 10, said adjustment means further including first and second servo control circuits each connected to receive error signals from said detection means for respectively operating said variable phase and gain control circuits in accordance with error signals from said detection means.

12. The system defined by claim 11, said first means including means for coherently detecting said phase component of said components of said undesired signal and said second means including means for coherently detecting said amplitude component of said components of said undesired signal.

13. The system defined by claim 12 wherein said variable phase and gain control circuits are connected in series.

14. The system defined by claim 13, said frequency control means including:
a voltage controlled oscillator connected to receive said phase lock error signals; and
a pair of mixer circuits each connected to a different one of said two output ports of said orthomode antenna and to said voltage controlled oscillator.

* * * * *